May 29, 1945.  M. MALLORY  2,376,973

IGNITION TIMING CONTROL MEANS FOR INTERNAL-COMBUSTION ENGINES

Filed Jan. 7, 1943

INVENTOR.
Marion Mallory
BY
Barnes, Kisselle, Laughlin & Raisch
Attorneys.

Patented May 29, 1945

2,376,973

UNITED STATES PATENT OFFICE 2,376,973

IGNITION TIMING CONTROL MEANS FOR INTERNAL-COMBUSTION ENGINES

Marion Mallory, Detroit, Mich.

Application January 7, 1943, Serial No. 471,558

5 Claims. (Cl. 123—117)

This invention relates to ignition timing control means for internal combustion engines.

The principal object of my invention is to control the pressures in the intake passageway of an internal combustion engine so that a single suction operated device will retard the spark timing when the engine is idling, advance the spark timing when the engine is working under light loads, and reduce the advance of the spark timing when the engine is working under full loads. This eliminates the commonly known centrifugal governor used in present day ignition systems.

It is also an object of this invention to produce an ignition timing control means wherein the spark timing can be readily advanced or retarded to satisfy the conditions necessary to obtain efficient operation of the engine. This object is achieved by an air bleed to the suction device, which air bleed can be increased to decrease the spark advance or decreased to increase the spark advance.

Figure 1:
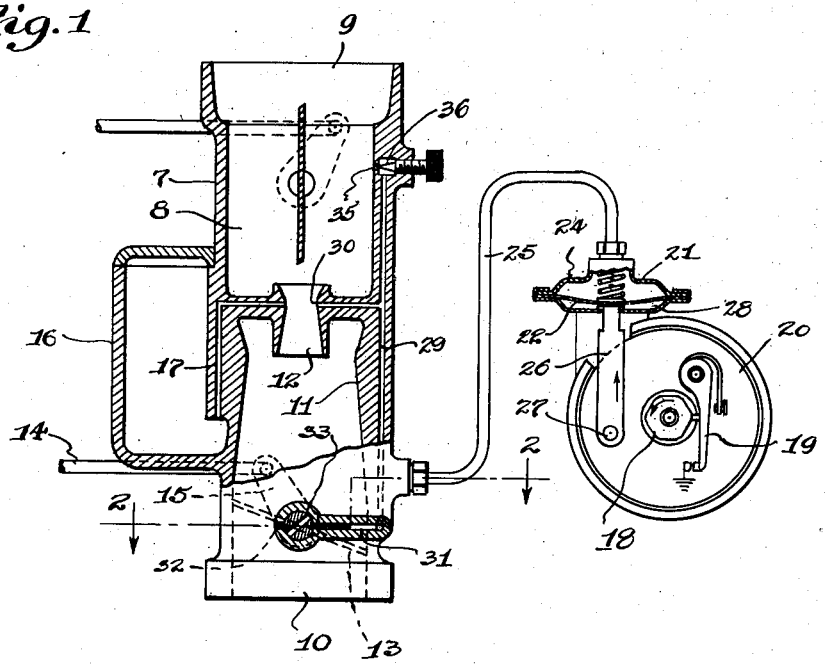
Fig. 1 is a sectional view partly in elevation showing the mechanism of my ignition timing control means for an internal combustion engine.
Figure 2:
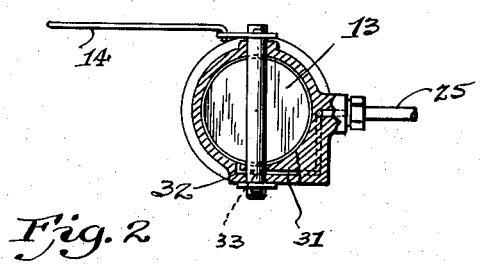
Fig. 2 is a section along the line 2—2 of Fig. 1.

The carburetor 7, adapted for attachment to an internal combustion engine, is provided with an intake passageway 8 having an air inlet end designated 9 and a fuel mixture outlet 10 through which the fuel mixture is adapted to pass into the engine intake manifold.

The passageway 8 includes the venturi 11 and for purposes of description rather than by way of limitation, a booster venturi 12 is positioned within the main venturi 11. 13 designates the usual butterfly throttle valve mounted within the passageway 8 on shaft 3 which is swung open and closed by the rod 14 and crank 15. The fuel float bowl is designated 16. Fuel is drawn from the float bowl through passageway 17 into the mixing chamber.

A conventional timing mechanism is shown consisting of the usual rotatable cam 18 which operates the electrical circuit breaker 19 mounted on plate 20 which can be rotated clockwise to advance the spark and counterclockwise to retard the spark. A suction device 21 is used for advancing and retarding the spark. The suction device comprises a flexible diaphragm 22 backed up by a compression coil spring 23. The diaphragm is mounted in housing 24 which is connected to the carburetor by conduit 25. The diaphragm is connected to plate 20 by rod 26, one end of which is pivotally connected as at 27 to the plate 20 and the other end of which is fixed to the diaphragm. The wall 28 of the housing is perforated so that the diaphragm is subjected on the outside to atmospheric pressure whereas on the inside of housing 24 the diaphragm is subjected through line 25 and passageway 29 and orifice 30 and passageway 31 to certain pressure conditions obtaining in and created by the intake passageway 8, as described below.

Passageway 29 communicates with conduit 25 and through orifice 30 communicates with venturi 12. If desired, passageway 29 can be connected into the large venturi 11 preferably at the point of greatest restriction, that is, adjacent the lower end of small venturi 12. Passageway 29 communicates with passageway 31. Passageways 29 and 31 are both formed in the wall of the carburetor. The wall of the carburetor is also provided with a passageway 32, the inner end of which communicates with the mixture outlet 10 and the other end of which, at certain positions of the throttle valve 13, communicates with the passageway 33 in the throttle valve shaft 34, as explained below.

The above described arrangement for connecting the suction device into the intake passageway 8 on the outlet 10 side or engine manifold side of throttle valve 13 is only one of the preferred ways of achieving this end. The same purpose can be equally well achieved by having the lower end of passageway 29 communicate with the intake passageway 8 by means of an orifice just above the left hand side of the throttle valve 13 so that as the throttle valve 13 is swung open from idle position, passageway 29 will be placed in communication with the intake passageway on the manifold side of valve 13. Such an arrangement is shown in my Patent 2,268,490.

The operation of the device as thus far described is as follows: When the engine is idling the throttle valve 13 will be almost closed or in idling position and conduit 31 is closed by the throttle shaft 34. At this time the suction device 21 communicates with intake passageway 8 only through orifice 30, passageway 29 and conduit 25 and the spark is retarded, as shown in the drawing, because the suction device will not be subjected to enough vacuum to advance the ignition timer against spring 23.

As the throttle valve 13 moves toward an open position diametrical passageway 33 in shaft 34 registers with passageway 32 and with passageway 31, thereby subjecting passageway 31 to the manifold vacuum because passageway 32 communicates with the mixture outlet 10 below throttle 13. As soon as passageway 31 is subjected to the intake manifold vacuum this, through conduit 25, subjects the diaphragm 22 to manifold vacuum and the spark is advanced. If the throttle valve 13 is opened wide or near its open position, passageway 33 rotates beyond passageways 32 and 31 and passageway 31 is again shut off by the throttle shaft 34. Thus, in this system the high suction in the manifold on the engine side of the throttle 13, when operating on part throttle or part load, is reduced or bled down by the passageway 29 terminating in the venturi 12 at orifice 30. Of course, it will be understood that the manifold vacuum is not bled down to a point as low as the vacuum created by the suction in the venturi because more spark advance is required when the throttle is only partly open than when the throttle is full open. The system actually produces two spark curves—one for part load and one for full load.

The amount that the spark is advanced by the suction device 21 is controlled by air bleeding the suction device to atmosphere, either directly or indirectly. As shown, the air bleed to atmosphere is effected by means of an orifice 35 controlled by needle valve 36 of the adjustable screw type. Orifice 35 as controlled by screw needle valve 36 communicates with passageway 29. Thus, it will be seen that the suction device 21 communicates indirectly with atmosphere through conduit 25, passageway 29, orifice 35 and carburetor inlet 9. The pressure at orifice 35 is always higher than in passageway 29 or at orifice 30 when the engine is operating. Thus screwing needle valve 36 inwardly or toward the left to restrict or close off orifice 35, reduces the air bleed to suction device 21 and therefor increases the suction or vacuum in suction device 21 and thereby gives the spark more advance. By turning the screw valve 36 outwardly or toward the right, the air bleed at orifice 35 is increased thereby bleeding down the suction or vacuum in suction device 21 and decreasing the spark advance. Thus, it will be seen that by adjusting valve 36 in relation to orifice 35 the degree of spark advance can be nicely adjusted to satisfy the desired spark advance for whatever type of engine used with the above described ignition timing control means. This principle of adjusting the spark advance is also useful when using different grade fuels. In other words, a low grade fuel requires less spark advance than the higher grade fuels. The operator of an engine can adjust the spark to meet the different fuel conditions. In high altitudes where more spark advance is required than in low altitudes, the spark adjustment is also useful.

I claim:

1. In an internal combustion engine the combination of an ignition timer, a fuel mixture intake passageway, a throttle valve positioned in the passageway, a suction controlled means for controlling the advancing and retarding of the said timer, a passageway connecting the suction means with the intake passageway on the atmosphere side of the throttle valve and with the intake passageway on the engine intake manifold side of the throttle valve, and an adjustable air bleed for said suction controlled means constructed and arranged to be adjustably set in any one of various positions to control the amount that the suction controlled means advances the timer whereby the spark advance can be adjusted to satisfy the spark advance requirements of said engine.

2. In an internal combustion engine the combination of an ignition timer, a fuel mixture intake passageway, a throttle valve positioned in the passageway, a suction controlled means for controlling the advancing and retarding of the said timer, a passageway connecting the suction means with the intake passageway on the atmosphere side of the throttle valve and with the intake passageway on the engine intake manifold side of the throttle valve, an orifice to atmosphere communicating with said second mentioned passageway, and an adjustable valve constructed and arranged to be adjustably set in any one of various positions for controlling the effective size of said orifice whereby the amount that the orifice bleeds the suction controlled means to atmosphere can be controlled to thereby control the amount that the suction controlled means advances the ignition timer to satisfy the spark advance requirements of said engine.

3. In an internal combustion engine the combination of an ignition timer, a fuel mixture intake passageway including a venturi, a throttle valve positioned in the intake passageway on the engine side of the venturi, a conduit communicating with the venturi and with the intake passageway on the engine side of the throttle valve, a suction controlled device connected into said conduit and connected to the ignition timer for controlling the advancing and retarding of said timer, and an adjustable air bleed to atmosphere for said conduit constructed and arranged to be adjustably set in any one of various positions whereby the amount that the suction device advances the ignition timer can be adjusted to satisfy the spark advance requirements of said engine.

4. In an internal combustion engine, an intake passageway, a throttle valve in said intake passageway, a venturi in said intake passageway on the atmosphere side of the throttle valve, a conduit having one end terminating in the venturi and another end terminating in the intake passageway on the engine side of the throttle valve when the throttle valve is open further than idle position, a suction controlled ignition timing device connected to said conduit for advancing and retarding the timing of the engine ignition system as the throttle or charge is varied, and an air bleed to atmosphere for said conduit in the form of an orifice leading to atmosphere and communicating with said conduit, and a valve constructed and arranged to be adjustably set in any one of various positions for adjusting the effective size of said orifice whereby the valve can be adjusted to control the amount that the suction device advances the ignition timing device to satisfy the spark advance requirements of the engine with which the suction controlled ignition timing device is operatively combined.

5. In an internal combustion engine having an intake manifold, a carburetor having an intake passageway, a throttle valve for said intake passageway, a venturi in said intake passageway on the atmosphere side of the throttle valve, a conduit having one end terminating in the venturi of the carburetor continuously on the atmosphere side of the throttle valve, a second conduit communicating with the first mentioned conduit, and valve means controlling the second conduit whereby the second conduit is placed in communication with the intake passageway on the engine side of the throttle valve at part open throttle and shut off from the intake passageway at idle position of the throttle, and a suction controlled ignition timing device continuously connected to the first mentioned conduit for advancing and retarding the timing of the engine ignition system as the throttle or charge is varied, an orifice in the intake passageway on the atmosphere side of the venturi and communicating with said conduit, and an adjustable valve constructed and arranged to be adjustably set in any one of various positions for controlling the effective size of said orifice whereby the amount that said orifice air bleeds the suction device to atmosphere can be controlled by adjusting said valve to satisfy the spark advance requirements of said engine.

MARION MALLORY.